(12) United States Patent
Cividini et al.

(10) Patent No.: US 11,649,865 B2
(45) Date of Patent: May 16, 2023

(54) SHAPED MATERIAL AND MANUFACTURING METHOD

(71) Applicant: Brembo S.P.A., Bergamo (IT)

(72) Inventors: Omar Cividini, Bergamo (IT); Lorenzo Miglioli, Bergamo (IT)

(73) Assignee: BREMBO S.P.A., Bergamo (IT)

( * ) Notice: Subject to any disclaimer, the term of this patent is extended or adjusted under 35 U.S.C. 154(b) by 0 days.

(21) Appl. No.: 15/746,330

(22) PCT Filed: Jul. 22, 2016

(86) PCT No.: PCT/IB2016/054376
§ 371 (c)(1),
(2) Date: Jan. 19, 2018

(87) PCT Pub. No.: WO2017/013626
PCT Pub. Date: Jan. 26, 2017

(65) Prior Publication Data
US 2018/0209497 A1  Jul. 26, 2018

(30) Foreign Application Priority Data

Jul. 22, 2015 (IT) .................. 102015000036808

(51) Int. Cl.
*C01B 32/956* (2017.01)
*F16D 65/12* (2006.01)
(Continued)

(52) U.S. Cl.
CPC .............. *F16D 65/125* (2013.01); *B32B 5/26* (2013.01); *C04B 35/573* (2013.01);
(Continued)

(58) Field of Classification Search
CPC ..... B29C 70/326; B29C 70/347; B29C 70/44; F16D 2200/0047; C04B 2235/3826
See application file for complete search history.

(56) References Cited

U.S. PATENT DOCUMENTS

| 3,712,428 A | 1/1973 | Marin |
| 4,813,126 A | 3/1989 | Williamson |

(Continued)

FOREIGN PATENT DOCUMENTS

| CA | 2 268 729 A1 | 4/1998 |
| DE | 10 2012 021 772 A1 | 5/2014 |

(Continued)

OTHER PUBLICATIONS

International Search Report and Written Opinion of the International Search Report for corresponding International Patent Application No. PCT/IB2016/054376 dated Oct. 5, 2016, 9 pages.

(Continued)

*Primary Examiner* — Matthew J Daniels
(74) *Attorney, Agent, or Firm* — Merchant & Gould P.C.

(57) ABSTRACT

A shaped material (1, 1'), for example a disk for a disk brake, preferably a ventilated disk, includes a plurality of layers of material (6) in a spiral shape, overlapping along a development axis (X). Each layer of material (6) it is formed by a fabric (2) predominantly or exclusively made of carbon fibres (8), at least part of the layers being impregnated by an impregnating agent. A method is for the manufacture of a shaped material.

19 Claims, 1 Drawing Sheet

(51) Int. Cl.
  *C04B 35/573* (2006.01)
  *C04B 35/80* (2006.01)
  *B32B 5/26* (2006.01)
  *C04B 35/657* (2006.01)

(52) U.S. Cl.
  CPC ............ *C04B 35/657* (2013.01); *C04B 35/80* (2013.01); *B32B 2260/023* (2013.01); *B32B 2260/046* (2013.01); *B32B 2262/106* (2013.01); *B32B 2475/00* (2013.01); *C04B 2235/3826* (2013.01); *C04B 2235/5248* (2013.01); *C04B 2235/616* (2013.01); *F16D 2200/006* (2013.01); *F16D 2200/0047* (2013.01); *F16D 2200/0052* (2013.01); *F16D 2200/0082* (2013.01); *F16D 2200/0086* (2013.01); *F16D 2200/0091* (2013.01); *F16D 2250/0053* (2013.01)

(56) References Cited

U.S. PATENT DOCUMENTS

| | | | | |
|---|---|---|---|---|
| 5,080,851 | A * | 1/1992 | Flonc | B29B 11/16 156/222 |
| 5,228,175 | A | 7/1993 | Olry et al. | |
| 5,242,745 | A | 9/1993 | Aucagne et al. | |
| 6,009,605 | A * | 1/2000 | Olry | B29B 11/16 28/107 |
| 6,248,417 | B1 | 6/2001 | Ponsolle et al. | |
| 6,261,981 | B1 * | 7/2001 | Dietrich | C04B 35/806 501/95.2 |
| 6,325,608 | B1 * | 12/2001 | Shivakumar | C04B 35/83 264/29.5 |
| 6,767,602 | B1 * | 7/2004 | Duval | C04B 35/83 156/148 |
| 2003/0168775 | A1 * | 9/2003 | Eberth | B29C 70/30 264/258 |
| 2004/0105969 | A1 * | 6/2004 | Huang | C04B 35/64 428/292.1 |
| 2004/0127600 | A1 | 7/2004 | Bauer et al. | |
| 2006/0151912 | A1 * | 7/2006 | Bauer | C04B 35/6269 264/257 |

FOREIGN PATENT DOCUMENTS

| | | |
|---|---|---|
| EP | 0 232 059 A2 | 8/1987 |
| EP | 0 528 336 A2 | 2/1993 |
| EP | 0 424 988 B2 | 12/1997 |
| EP | 0 721 835 B2 | 12/2002 |
| EP | 0 683 261 B1 | 3/2003 |
| EP | 1 357 211 A1 | 10/2003 |
| EP | 2 781 784 A1 | 9/2014 |
| EP | 2 472 136 B1 | 5/2015 |
| FR | 2 490 687 A1 | 3/1982 |
| GB | 2 148 187 B | 3/1987 |
| GB | 2 426 976 A | 12/2006 |
| GB | 2 444 927 A | 6/2008 |
| WO | 03/033930 A1 | 4/2003 |
| WO | 2006/127002 A1 | 11/2006 |
| WO | 2013/171770 A1 | 11/2013 |
| WO | 2015/084556 A1 | 6/2015 |

OTHER PUBLICATIONS

Notice of Opposition for European Patent Application No. 16757954.9 dated Mar. 15, 2022, 87 pages.
Figueiredo, J. et al., "Carbon Fibers Filaments and Composites", Nato Asi Series, Kluwer Academic Publishers, Series E Applied Sciences, 177: 1-47 (1990).
Windhorst, T. et al., "Carbon-carbon composites: a summary of recent developments and applications", Materials & Design, 18(1): 11-15 (1997).
Krenkel, W., et al., "High Temperature Ceramic Materials and Composites", 7th International Conference on High Temperature Ceramic Matrix Composites (HT-CMC 7), 1-938 (2010).

\* cited by examiner (A)　　　　　　　　　(B)

SHAPED MATERIAL AND MANUFACTURING METHOD

This application is a National Stage Application of PCT/IB2016/054376, filed 22 Jul. 2016, which claims benefit of Ser. No. 102015000036808, filed 22 Jul. 2015, and which applications are incorporated herein by reference. To the extent appropriate, a claim of priority is made to each of the above disclosed applications.

BACKGROUND OF THE INVENTION

This invention relates to a shaped material and a manufacturing method for the production of a shaped material, for example a disc-brake disc.

The use of discs for disc brakes made with carbon-based materials (so-called Carbon Carbon, or "C/C") has long been known.

These discs are obtained through a process that provides for the overlapping of layers of fabric, the possible addition of resins, and subsequent appropriate heat treatments that lead to an increase of the thermal conductivity and densification processes with carbon.

The latter can for example be performed by mean's of CVD (Chemical Vapour Deposition), CVI (Chemical Vapour Infiltration) or LPI (Liquid Polymer Infiltration).

In some applications these materials may be used for working as friction elements at high temperatures, a circumstance that does not make them suitable for standard road applications, but rather high-range applications.

Traditionally, for the production of C/C disc-brake discs, due to the special architecture that is formed inside the related stratified structure, there are regions of the disc that are critical to the structural level because they have a low resistance to bending.

It follows that, in correspondence of these regions, cracks or fractures could be created that are unacceptable for certain high use bands, from the point of view of performances, for the most extreme braking applications, as in the case of sports cars or even in other means of transport that travel at high speeds.

SUMMARY OF THE INVENTION

This invention relates to the preceding context, proposing to provide a shaped material and a method able to drastically reduce the possibility of fractures in a disc brake, not only by virtue of the continuous stratified structure that develops inside the material.

BRIEF DESCRIPTION OF THE DRAWINGS

The object of this invention will now be described in detail, with the help of the accompanying drawings, in which.

DETAILED DESCRIPTION OF THE PREFERRED EMBODIMENT

Figure 1:
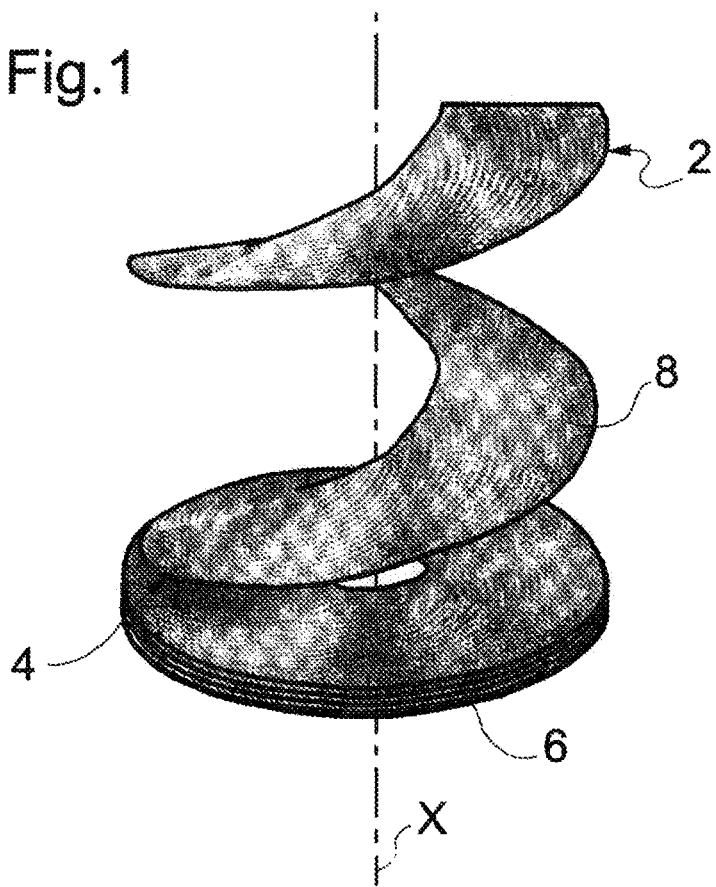
FIG. 1 is a perspective view of a fabrication step of the shaped material of this invention, according to a possible embodiment.

The above objective is achieved through a manufacturing method for the production of a shaped material 1,1' comprising steps of:

i) providing a fabric 2 predominantly or exclusively made of carbon fibres 8, manufactured in a spiral shape around a development axis X, in particular around a spiral-development axis X (as shown in FIG. 1);

ii) axially overlapping the coils 4 of said fabric 2 so as to form a plurality of layers of material 6;

iii) optionally needling—for example using shaped needles—the coils 4 of step ii), so as to transpose the carbon fibres or precursors of such fibres through the thickness of the layers of material 6;

iv) impregnating at least part of the layers of material 6 of step ii) or step iii) by means of an impregnating agent, preferably a phenolic resin;

v) densifying the product of step iii) or iv) up to a desired density range to obtain the shaped material 1,1'. For example, the desired density range could be about 1.3-1.45 g/cm$^3$.

In this description, unless otherwise specified, the terms "radial", "axial", "angular" and "circumferential" will always be understood with respect the development axis X.

According to the illustrated embodiment, the development axis X is substantially rectilinear.

As regards the expression "spiral", in this description this term substantially means a fabric 2 manufactured in the form of a three-dimensional curve that develops around the development axis X with a preferably constant distance, or a continuously variable distance, as it moves parallel to this axis X.

In other words, the term spiral refers to a fabric manufactured substantially in the form of a helix, which wraps around the development axis X.

It follows that, according to an embodiment, the fabric 2 is manufactured in the form of a ribbon or tape that extends in curvilinear manner (optionally in a ring-like manner) about the development axis X.

According to a further variant, at step ii) the layers of material 6 will have respective layer surfaces, advantageously planar surfaces, arranged in planes substantially orthogonal to the development axis X. In particular, such surfaces are facing each other to achieve an at least partial mutual abutment.

According to a particularly advantageous embodiment, this process is particularly suitable for the production of discs for disc brakes, preferably of the ventilated type.

Merely by way of example, at least part of the carbon fibres (preferably all such fibres) are obtained from oxidised polyacrylonitrile fibres. For example, but not necessarily, such fibres could be produced by the company SGL Carbon SE under the tradename Panox®.

According to a preferred variant, the shaped material 1 comprises a carbonaceous matrix (i.e., composed at least 50% of carbon) in which at least part of the carbon fibres 8 is at least partially englobed.

According to a preferred embodiment, step i) comprises at least a step of weaving the carbon fibres 8 into a warp-and-weft fabric 2 that develops with substantial continuity through the plurality of coils 4.

More precisely, the warp of the fabric 2 will develop in the form of a spiral or helix around the axis X through the coils, while the weft will be oriented in a substantially or generally radial manner with respect to said axis X.

According to a first variant, step i) comprises a step of providing at least partially (for example completely) carbonised carbon fibres 8.

According to a second variant, step i) comprises a step of providing carbon fibres 8 in the polymeric state. According to this variant, following step ii), the method preferably comprises a step of carbonising the carbon fibres 8 of the layers of material 6, for example at a temperature of about 1500-1900° C., preferably at about 1700° C.

Optionally, step iv) could be conducted at least partially simultaneously with step ii) and could comprise a sub-step of distributing the impregnating agent between the coils 4 so as to place it between the layers of material 6.

According to various embodiments, the impregnating agent may be in solid particle form (for example powder), in film or tape form (optionally with a spiral/helical geometry), or in liquid form.

According to an advantageous variant, the process comprises at least a step of hardening the impregnating agent in correspondence to, or following, step v).

According to a further advantageous variant, step iv) could be conducted at least partially simultaneously with step v) and could include sub-steps of:

a) heating under vacuum the product of step ii) or iii);

b) injecting the impregnating agent in fluid, in particular in liquid, form in the product of sub-step a);

c) hardening the impregnating agent in the product of sub-step b), preferably thermally.

This embodiment is to be considered one of the best from a technical point of view in that—in the face of a higher overall production cost—it allows obtaining high-strength materials, with complex geometries and tight dimensional tolerances.

According to other embodiments, implementable individually or jointly, the process could comprise one or more steps selected from:

vi) pyrolysing the product of step v) or of sub-step c), for example at a temperature of about 800-1000° C.;

vii) mechanically working the product of step v), step vi) or sub-step c), for example in order to obtain inside it the structures necessary for its related mounting;

viii) infiltrating with silicon the product of step v), step vi), step vii) or sub-step c), so that part of the carbon C of the carbon fibres 8 and/or a carbonaceous matrix of said material 1 forms silicon carbide SiC by reaction with part of the infiltrated silicon Si;

ix) optionally grinding and/or treating with an anti-oxidant at least one of the products of steps vi) to viii).

Preferably, before step v), the process comprises a step of compacting the layers of material 6 of step ii), step iii) or step iv) by means of a vacuum bag in the presence of a weak heating, for example at a temperature in the range 70-100° C.

According to further embodiments, step v) could comprises at least a step of hot stamping and/or densifying by means of CVD (Chemical Vapour Deposition) the product of step iv).

The above objectives are also achieved by means of a shaped material 1, 1', for example for a disc-brake disc, as described below.

According to possible embodiments, such a disc-brake disc could be of the ventilated or non-ventilated type.

Since this material is preferably obtained through the process described previously, even if not explicitly stated, preferred or accessory variants of such material could comprise any characteristic deducible even only implicitly, from the point of view of the manufacturing steps, from the foregoing description.

The shaped material 1, 1' comprises a plurality of layers of material 6 in a spiral shape (according to the definition provided previously), overlapping along a development axis X, wherein each layer of material 6 is formed by a fabric 2 predominantly or exclusively made of carbon fibres 8. At least part of these layers is impregnated by an impregnating agent, preferably a phenolic resin.

Figure 2:
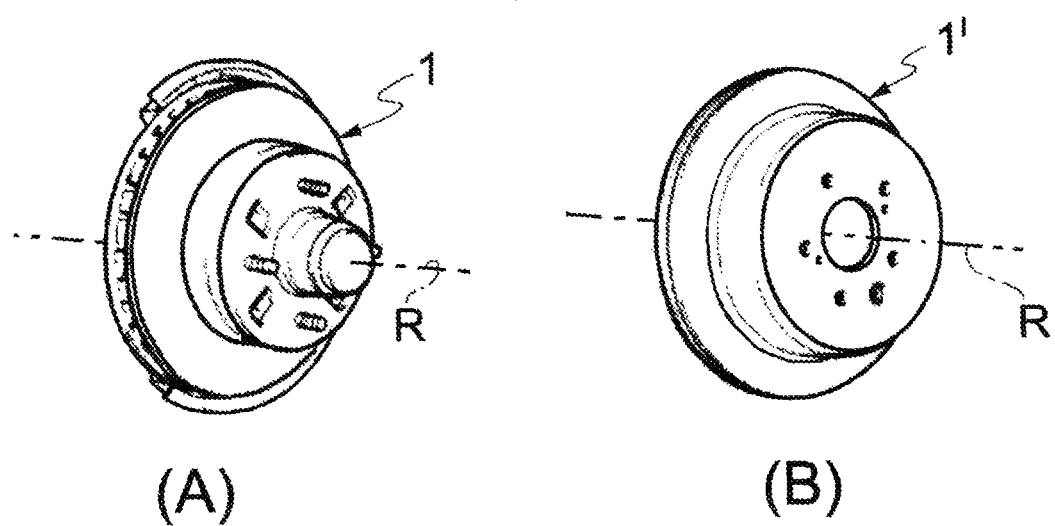
FIGS. 2a and 2b represent discs for disc brakes achievable according to this invention, according to possible variants, the disc of FIG. 2a being of the ventilated type.

As, for example, shown in FIG. 2, the development axis X (or spiral development axis X) could be oriented parallel to a rotation axis R of the shaped material 1, 1', or of the disc-brake disc, during its use.

According to a preferred variant, the fabric 2 has a warp-and-weft construction that develops with substantial continuity through the plurality of layers of material 6.

Preferably, at least part of the carbon fibres (for example, all) is carbonised.

According to a further advantageous variant, this material 1, 1' could comprise zones of silicon carbide SiC obtained by reaction of part of the carbon C of the carbon fibres 8 with at least part of the silicon Si infiltrated in said material 1, 1'. Preferably, such silicon carbide zones are arranged in a bridging manner between adjacent layers of material 6, specifically to consolidate them and bind them together.

According to various embodiments, also implementable separately, the inner diameter of the coils 4 could be equal to, or greater than, about 100 millimetres (for example 150 millimetres), and/or the width of the layers of material 6 in the radial direction could be in the range of 10-280 millimetres.

Advantageously, this shaped material 1, 1' is characterised in that it has a residual porosity smaller than 5%, for example equal to, or smaller than, 3%. Specifically, such porosity could be evaluated at the end of step viii) of infiltration with silicon.

According to a possible embodiment, the number of layers of material 6 in the shaped material 1, 1' could be in the range of 18-26, optionally in the range of 20-24.

According to a first variant, along the development axis X the shaped material could have a thickness of about 25-35 millimetres. For example, the shaped material with such thickness could be or comprise a disc brake of the ventilated type.

According to a second variant, along the development axis X the shaped material could have a maximum thickness of about 10 millimetres, for example comprised in the range of 5-10 millimetres. For example, the shaped material with this thickness could be or comprise a disc brake of the non-ventilated type.

Innovatively, the shaped material and method of this invention allow brilliantly solving the drawbacks of the prior art.

More precisely, the continuous structure previously discussed allows reducing—or even eliminating—the weak points of low resistance of the known shaped materials, at the same time maintaining a substantially circular arrangement of the carbon fibres.

Advantageously, the method and the shaped material of this invention can be implemented with great simplicity in any existing production line, especially by virtue of its constructive simplicity.

Advantageously, the method and the shaped material of this invention allow achieving considerable economies of manufacture, by virtue of the fact that specific processing does not require supplementary or additional equipment respect to those normally provided.

Advantageously, the method and the shaped material of this invention allow containing the realisation costs and the times of the material to be shaped, especially in the early stages of manufacture.

Advantageously, the method and the shaped material of this invention allow eliminating additional cutting steps, and the need to overlap circular sectors of different size for the realisation of the shaped material.

Advantageously, the method and the shaped material of this invention allow avoiding steps of extreme compression during manufacture, since the overlapping between the coils provides spontaneously—due to the nature and arrangement of the fabric itself—substantially flat surfaces that are advantageous and desired in the use of the shaped material.

To the embodiments of the aforesaid method and shaped material, one skilled in the art, in order to meet specific needs, may make variants or substitutions of elements with others functionally equivalent.

Even these variants are contained within the scope of protection, as defined by the following claims.

Moreover, each of the variants described as belonging to a possible embodiment can be realised independently of the other variants described.

The invention claimed is:

1. A process for production of a shaped material, comprising the following steps:
   i) providing a fabric exclusively made of carbon fibres or precursors of the fibres, manufactured in a spiral shape around a development axis;
   ii) axially overlapping coils of said fabric to form a plurality of layers of material;
   iii) needling the coils of step ii), so as to transpose the carbon fibres or precursors of the fibres through thickness of the layers of material;
   iv) impregnating at least part of the layers of material of step ii) or step iii) by an impregnating agent;
   v) densifying the product of step iii) or iv) up to a desired density range to obtain the shaped material consisting of the plurality of layers of material; wherein the densifying comprises at least a step of hot stamping; and wherein the density range is 1.35 g/cm$^3$ to 1.45 g/cm$^3$;
   vi) infiltrating with silicon the product of step v) so that part of the carbon of the carbon fibres and/or a carbonaceous matrix of said material reacts with part of the infiltrated silicon and forms silicon carbide zones, wherein the silicon carbide zones bridge between adjacent layers of material and consolidate the layers of material and bind the layers of material together.

2. The process according to claim 1, wherein step i) comprises at least a step of weaving said carbon fibres into a warp-and-weft fabric that develops with substantial continuity through the plurality of coils, wherein the warp of the fabric develops around said axis through the coils, while the weft is oriented in substantially radially with respect to said axis.

3. The process according to claim 1, wherein the fabric is manufactured as a ribbon extending in curvilinear fashion around the development axis.

4. The process according to claim 1, wherein step i) comprises a step of providing carbon fibres in a polymeric state as said precursors of the carbon fibres and wherein, following step ii), said process comprises a step of carbonising the carbon fibres of said layers of material at a temperature of 1500-1900° C.

5. The process according to claim 1, wherein step iv) is conducted at least partially simultaneously with step ii) and comprises a sub-step of distributing the impregnating agent between the coils so as to place the impregnating agent between the layers of material.

6. The process according to claim 1, comprising at least a step of hardening the impregnating agent in correspondence to, or following, step v).

7. The process according to claim 6, comprising one or more steps selected from among:
   vii) pyrolysing the product of step v), at a temperature of 800-1000° C.;
   viii) mechanically working the product of step v), or step vi);
   ix) treating with an anti-oxidant at least one of the products of steps vi) to viii).

8. The process according to claim 1, wherein step iv) is conducted at least partially simultaneously with step v) and includes sub-steps of:
   a) heating under vacuum the product of step ii) or iii);
   b) injecting the impregnating agent in fluid form in the product of sub-step a);
   c) hardening the impregnating agent in the product of sub-step b).

9. The process according to claim 8, comprising one or more steps selected from among:
   vii) pyrolysing the product of step v) or of sub-step c), at a temperature of 800-1000° C.;
   viii) mechanically working the product of step v), step vi) or sub-step c);
   ix) treating with an anti-oxidant at least one of the products of steps vi) to viii).

10. The process according to claim 1, wherein the impregnating agent is a granulometric solid, a film or a tape, spiral-shaped, or in liquid form.

11. The process according to claim 1, comprising, before step v), a step of compacting the layers of material of step ii), step iii) or step iv) by a vacuum bag in the presence of a weak heating, at a temperature in the range 70-100° C.

12. The process according to claim 1, wherein the shaped material comprises a disk for a disk brake.

13. The process according to claim 1, wherein the impregnating agent comprises a phenolic resin.

14. The process according to claim 1, wherein the shaped material has a residual porosity less than 5%.

15. The process according to claim 1, wherein the shaped material has a residual porosity less than 3%.

16. A process for production of a shaped material, comprising the following steps:
   i) providing a fabric exclusively made of precursor fibres, manufactured in a spiral shape around a development axis;
   ii) axially overlapping coils of said fabric to form a plurality of layers of material;
   iii) needling the coils of step ii), so as to transpose the precursor fibres through thickness of the layers of material;
   iv) impregnating at least part of the layers of material of step ii) or step iii) by an impregnating agent;
   v) densifying the product of step iv) up to a density range of 1.35 g/cm$^3$ to 1.45 g/cm$^3$ to obtain the shaped material consisting of the plurality of needled and/or impregnated layers of material, the densifying comprising at least a step of hot stamping;
   vi) infiltrating with silicon the product of step v) so that part of the carbon of the precursor fibres and/or a carbonaceous matrix of said material reacts with part of the infiltrated silicon and forms silicon carbide zones, wherein the silicon carbide zones bridge between adjacent layers of material and consolidate the layers of material and bind the layers of material together, and wherein the carbonaceous matrix is composed of at least 50% carbon and at least a portion of the precursor fibres is at least partially englobed.

17. The process according to claim 16, wherein the precursor fibres comprise polyacrylonitrile fibres.

18. The process according to claim 16, wherein the shaped material has a residual porosity less than 5%.

19. The process according to claim 16, wherein the shaped material has a residual porosity less than 3%.

* * * * *